United States Patent
Rabiei

(10) Patent No.: US 9,746,743 B1
(45) Date of Patent: Aug. 29, 2017

(54) ELECTRO-OPTIC OPTICAL MODULATOR DEVICES AND METHOD OF FABRICATION

(71) Applicant: Payam Rabiei, Vista, CA (US)

(72) Inventor: Payam Rabiei, Vista, CA (US)

(73) Assignee: Partow Technologies, LLC., Vista, CA (US)

( * ) Notice: Subject to any disclaimer, the term of this patent is extended or adjusted under 35 U.S.C. 154(b) by 0 days.

(21) Appl. No.: 15/224,546

(22) Filed: Jul. 30, 2016

Related U.S. Application Data

(60) Provisional application No. 62/199,809, filed on Jul. 31, 2015.

(51) Int. Cl.
| | | |
|---|---|---|
| *G02F 1/225* | (2006.01) | |
| *G02B 6/132* | (2006.01) | |
| *G02B 6/136* | (2006.01) | |
| *G02B 6/12* | (2006.01) | |
| *G02B 6/122* | (2006.01) | |
| *G02F 1/21* | (2006.01) | |

(52) U.S. Cl.
CPC ....... *G02F 1/2255* (2013.01); *G02B 6/12009* (2013.01); *G02B 6/1225* (2013.01); *G02B 6/132* (2013.01); *G02B 6/136* (2013.01); *G02B 2006/12061* (2013.01); *G02B 2006/12173* (2013.01); *G02F 2001/212* (2013.01); *G02F 2202/07* (2013.01)

(58) Field of Classification Search
CPC .... G02B 6/12009; G02B 6/1225; G02B 6/13; G02B 6/131; G02B 6/132; G02B 6/136; G02B 2006/12061; G02B 2006/1204; G02B 2006/12042; G02B 2006/12045; G02B 2006/12173; G02F 1/2255; G02F 2001/212; G02F 2202/07

USPC .......................................................... 438/31
See application file for complete search history.

(56) References Cited

U.S. PATENT DOCUMENTS

| | | | | |
|---|---|---|---|---|
| 2004/0253555 | A1* | 12/2004 | Yasuda | G03C 1/76 430/523 |
| 2014/0004638 | A1* | 1/2014 | Rabiei | G02B 6/13 438/31 |

OTHER PUBLICATIONS

Rabiei et al. ("Heterogeneous lithium niobate photonics on silicon substrates," Optics Express, vol. 21, No. 21 25573-25581, Oct. 21, 2013).*

* cited by examiner

*Primary Examiner* — Yasser A Abdelaziez
(74) *Attorney, Agent, or Firm* — Invent Capture, LLC.; Samuel S. Cho

(57) ABSTRACT

A novel electro-optic optical modulator device and a related method for creating the novel optical modulator device are disclosed. In one embodiment, the novel optical modulator comprises a high index contrast optical waveguide, a mesa region, electrical modulation electrodes, RF transmission lines, and interconnection layers. The high index contrast optical waveguide comprises an electro-optic slab core region and a high index ridge core region. A mesa section which includes the core regions can be formed, and electrical modulation electrodes are placed on etched sidewalls of the mesa section to achieve electro-optical index modulation of the electro-optic slab core region. The RF transmission lines include RF electrodes that connected to the electrical modulation electrodes. The interconnection layers connect the modulation electrodes with the RF electrodes by using etched vias. The novel optical modulator can also incorporate foldable modulation arms for poling in the electro-optic slab core region.

12 Claims, 9 Drawing Sheets

ELECTRO-OPTIC OPTICAL MODULATOR DEVICES AND METHOD OF FABRICATION

FIELD OF THE INVENTION

The present invention generally relates to a method for producing compact electro-optical modulators and other integrated electro-optical elements. The present invention also relates to electro-optical modulators that are based on thin film lithium niobate or lithium tantalite waveguides, and a mesa that is etched into these materials and radio frequency (RF) transmission lines. The present invention also relates to optical modulator devices that are fabricated on silicon substrates Furthermore, the present invention also relates to low direct current (DC) drift modulators and high speed modulators. In addition, the present invention also relates to compact modulators with poled and folded arms that accommodate fabrication of small footprint devices made from electro-optical materials. Furthermore the invention relators to resonance enhanced Mach-Zehnder modulators made using electro-optic materials.

BACKGROUND OF THE INVENTION

In a variety of electronic communication applications, optical modulators may be utilized in high-speed data communications and/or sensory data communications. For example, optical modulators are commonly utilized in analog RF signal transmission applications, digital signal transmission applications, and/or sensory data transfer applications that further utilize optical fibers for data communication. A simple Mach-Zehnder interferometer optical modulator has two optical coupler sections and two arms in which the optical phase of the signal is modulated in the arms of modulator. This conventional design is vulnerable to interference in the second coupler, thus resulting in an intensity modulation. A typical optical modulator may include several optical waveguides, radio frequency (RF) transmission lines, modulation electrodes, DC electrodes, and an optical circuit, which modulate and combine optical signals to achieve a variety of different modulation schemes. Various types of conventional-design optical modulators are typically utilized for a variety of applications. These conventional devices can modulate optical phases, intensity, or both, which are typically generated by a laser.

Conventional lithium niobate optical modulator waveguides are manufactured via an application of a diffusion method. The diffusion method is conventionally able to create a low index contrast optical waveguide. Conventional optical modulator waveguides have low electro-optical efficiency and have large foot prints due to their low index contrast waveguides. The inventor of record in this application, Payam Rabiei, has previously disclosed new methods for creating high index contrast waveguides in U.S. Pat. No. 8,900,899 and US Patent Application Publication 2015/0001175. With these new methods of waveguide manufacturing techniques, a high index contrast optical waveguide can be created in lithium niobate thin films by transferring a thin layer of lithium niobate to a silicon substrate and by creating a ridge waveguide on the lithium niobate thin films. With these new methods of fabrication, high-index contrast optical waveguides and optical modulators can be created much more compactly than conventional diffusion based optical waveguides.

Previously, the inventor of record has also disclosed an optical modulator structure that is based on the high index optical waveguide fabrication method has (P. Rabiei, Optics Express, Vol 21, pp. 25573-25581, 2013). The electrodes were placed in close proximity of the optical waveguide on top of the electro-optical material and no etching was performed to form a mesa structure.

As the electro-optical modulator circuit complexity increases, some novel fabrication steps and production techniques may be desirable to enable formation of advanced modulators in electro-optic materials. Various optical circuits that are used to achieve optical signal modulation are typically large, and a conventional optical modulator device often requires attaching several dice on different substrates, where the optical circuits are then fabricated on the different substrates. The conventional optical modulator is unnecessarily large, costly, and limits the performance of the optical circuits. Therefore, it may be desirable to provide a novel optical modulator that is spatially compact for cost efficiency and higher device performance characteristics. Furthermore, it may also be desirable to provide a novel optical modulator that exhibits a low DC bias drift and a high modulation speed. In addition, it may also be desirable to provide a novel method of fabricating the novel optical modulator, which is spatially compact with the low DC bias drift and the high modulation speed.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In a preferred embodiment of the invention, a method for producing an optical modulator device is disclosed. This method comprises the steps of: depositing or growing a first low refractive index material layer as a cladding layer on top of a silicon base substrate; depositing or transferring an electro-optic material layer on top of the first low refractive index material layer to form a slab core region; depositing a high refractive index material layer on top of the slab core region and forming a waveguide by etching the high refractive index material layer; forming an etch mask on the optical modulator device using a bilayer resist process; etching the electro-optic material to access the first low refractive index material layer; forming an electrode layer by depositing a metal and utilizing a lift-off process; depositing a second low refractive index material layer; etching vias in the second low refractive index material layer; and forming an RF transmission line layer by electro-plating or another layer-forming method.

In another embodiment of the invention, a novel optical signal modulator is disclosed. This optical signal modulator comprises high index contrast optical waveguides, mesa regions, electrical modulation electrodes, RF transmission lines and interconnection layers. Furthermore, each of the high index contrast optical waveguide comprises an electro-optic slab core region and a high index ridge core region. A mesa section which includes the core regions is then formed. One or more modulation electrodes are then placed on etched sidewalls of the mesa section to achieve electro-optical index modulation of the electro-optic slab core region. The RF transmission lines includes RF electrodes, which are connected to the modulation electrodes. The interconnection layers connect the modulation electrodes with the RF electrodes by using etched vias.

In addition, an embodiment of the invention also discloses a novel layout for an optical modulator, wherein the novel layout incorporates foldable modulation arms in the optical modulator and poling in an electro-optic slab core region. Preferably, the size of electro-optic modulators may be reduced by more than tenfold by utilizing the novel layout, as disclosed in one or more embodiments of the invention.

In addition the invention discloses resonance enhanced optical Mach-Zehnder optical modulator circuits that is achieved that are made with fabrication method, and by using electo-optic materials that are disclosed in this invention.

DETAILED DESCRIPTION

Figure 1A:
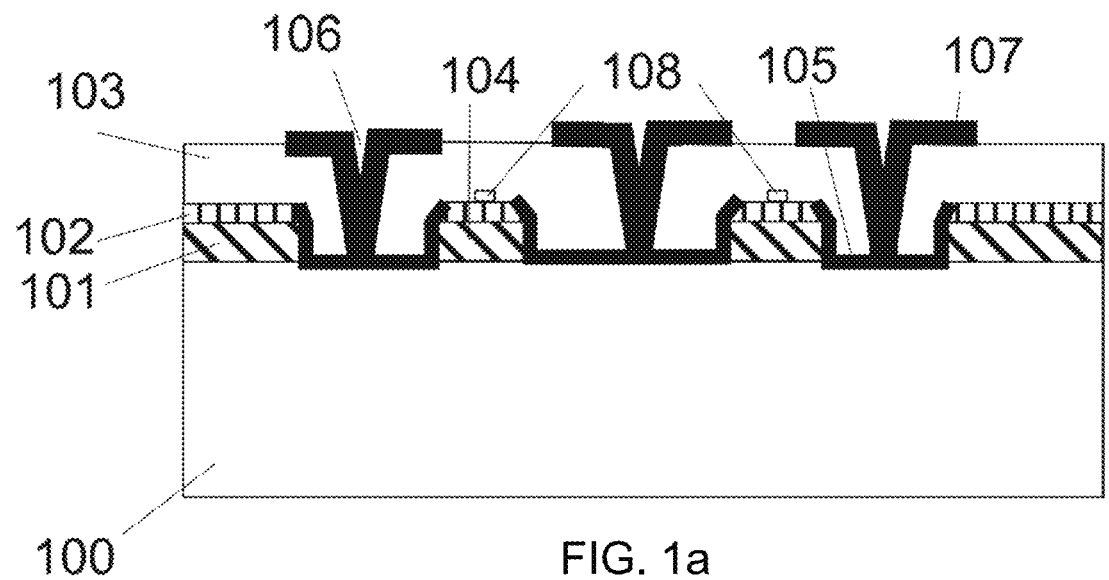
FIG. 1a shows a cross section of an optical modulator device that shows optical waveguides, mesa, modulation electrodes and RF transmission lines, and an interconnection layer, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble one or more optical modulator production methods and spatially-compact optical modulators that exhibit a low DC bias drift and a high modulation speed, in accordance with various embodiments of the invention. These apparatus and process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

In one embodiment of the invention, a novel method for integrating electrical modulation electrodes and RF transmission lines with high index contrast optical waveguide for creation of a compact optical modulator is disclosed. Preferably, the compact optical modulator fabricated from this novel method reduces or removes a DC drift problem that exist characterizes prior art devices. Furthermore, the compact optical modulator is able to accommodate high-speed traveling wave modulators using high-index optical waveguides on silicon substrates.

Moreover, a novel method of fabricating an optical modulator using high index contrast waveguide is also disclosed. This method comprises fabrication of a high index contrast waveguide using electro-optic crystals, etching of the electro-optic material to access the z faces of the electro-optic material to form a mesa, optional etching of lower cladding layer of the optical waveguide, deposition and patterning of electrodes of the device, deposition of top cladding layers, etching of vias, and deposition of RF electrodes.

Resonance-enhanced Mach-Zehnder optical modulators enable significant reduction in the size of optical modulators, which allows very short electrode length to be feasible for optical signal modulation. The short electrode length makes extremely high speed modulators practical for design and manufacturing. Utilizing resonance effect to achieve optical amplitude and phase modulation may provide some significant advantages in optical modulator designs for certain applications. For example, this method enables practical manufacturing of very compact optical modulators that can achieve high-speed modulation due to the compact length of the electrodes. In one embodiment of the invention, a novel optical circuit that provides a compact optical modulator based on resonance-enhanced effect for improving the linearity of optical amplitude modulators and for achieving high-speed performance made in electo-optic materials is disclosed. Furthermore, a novel optical fabrication method related to the novel optical circuit is also disclosed.

FIG. 1a shows a cross section of an optical modulator device that shows optical waveguides, mesa, modulation electrodes and RF transmission lines, and an interconnection layer, in accordance with an embodiment of the invention. In this embodiment, the optical modulator device comprises a substrate (100), a lower cladding layer (101) for the optical waveguide, a slab core region layer (102) made from electro-optic materials, a ridge core section (108), a mesa region (104) formed by etching into the electro-optic and lower cladding layer, modulation electrodes (105), a top cladding and passivation layer (103), etched vias (106) in the top cladding layer, and RF transmission line electrodes (107) that are connected to the modulation electrodes (105) through the etched vias (106).

The structure of the optical modulator, as shown in FIG. 1a, is configured to achieve a high modulation bandwidth, a low DC bias drift, a low modulation voltage, and convenient manufacturability. Because the lower cladding layer (101) is slightly conductive, the formed mesa disclosed in this invention eliminates the DC drift problem that exists in prior arts by directly injecting electrons into the lower cladding layer.

Figure 1B:
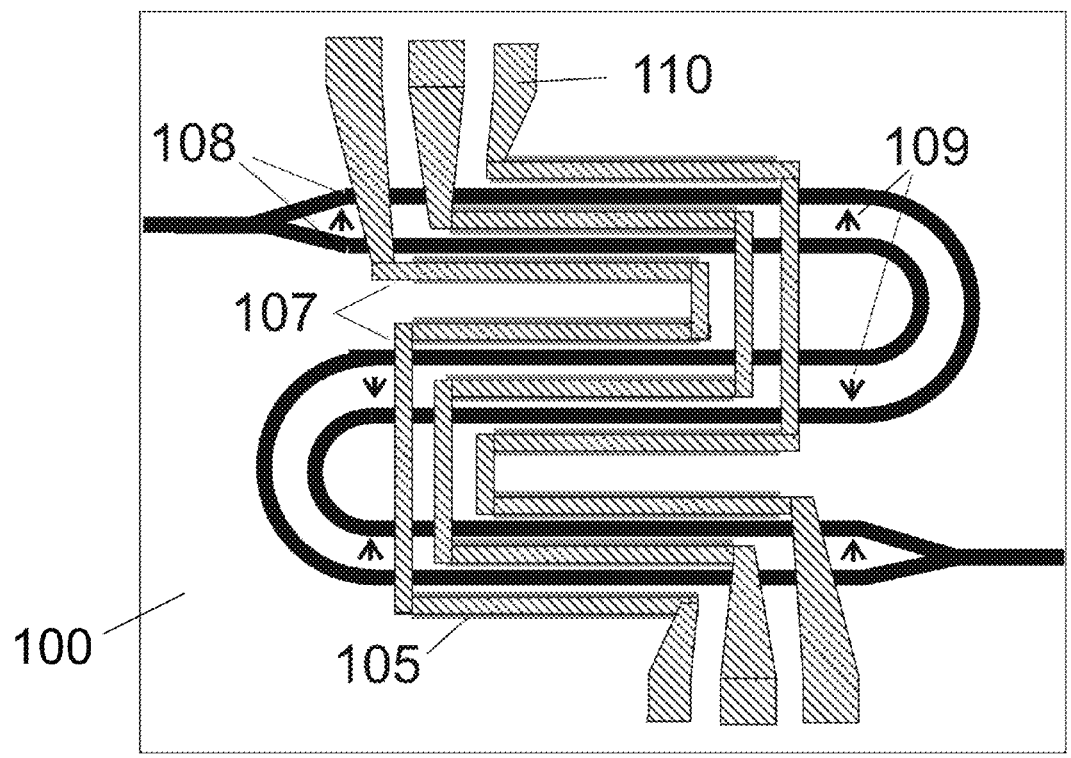
FIG. 1b shows a layout of optical modulator device that incorporates optical waveguides, modulation electrodes, and RF transmission lines, in accordance with an embodiment of the invention.

FIG. 1b shows a layout of an optical modulator that incorporates optical waveguides, modulation electrodes, and RF transmission lines, in accordance with an embodiment of the invention. The layout, which is a top view schematic of the optical modulator, can be created in accordance with a production method disclosed in an embodiment of the invention. The cross section from FIG. 1a and the layout from FIG. 1b both show the substrate (100), the high index optical waveguide (108), the RF transmission line electrodes (107), the modulation electrodes (105), and the device pads (110).

In one embodiment of the invention, the optical modulator comprises two Y-junction and two arms. The optical waveguides, the modulation electrodes, the mesa, and the RF transmission lines can be produced by utilizing a novel fabrication method disclosed in FIGS. 2a~2g and their related descriptions. The optical modulator may be a novel type of a Mach-Zehnder modulator that incorporates two folding arms (108) and contains optical waveguides and RF transmission lines. Unlike electrodes in a conventional optical modulator, which are typically straight and are made with low index contrast electro-optic materials, the novel optical modulator in accordance with an embodiment of the invention include the two folding arms of the high index optical waveguide (108), as shown in FIG. 1b.

In a preferred embodiment of the invention, different sections of the electro-optic slab core region (102 of FIG. 1a) of each optical waveguide are poled in different directions, as shown by arrows (109 of FIG. 1b), in order to make the optical modulator spatially compact and efficient. The two folding arms of the high index optical waveguide (108) and the RF transmission line electrodes (107) are folded to form convolutions, as shown in FIG. 1b, which achieves two positive advantages. First, by folding the arms, it is possible to make a spatially-compact optical modulator which can be readily applied advantageously in a variety of optical and sensor communications. Second, by folding the arms in the optical modulator, it is possible to achieve quasi-phase and velocity matching between an RF modulation field and an optical field in the device. This may be particularly important for high-speed modulation applications. Because an RF refractive index is higher than an optical field refractive index, when a shorter RF transmission line path is utilized relative to a longer optical waveguide path, it is possible to compensate the optical path difference and achieve phase matching needed for high speed modulation.

Figure 2A:
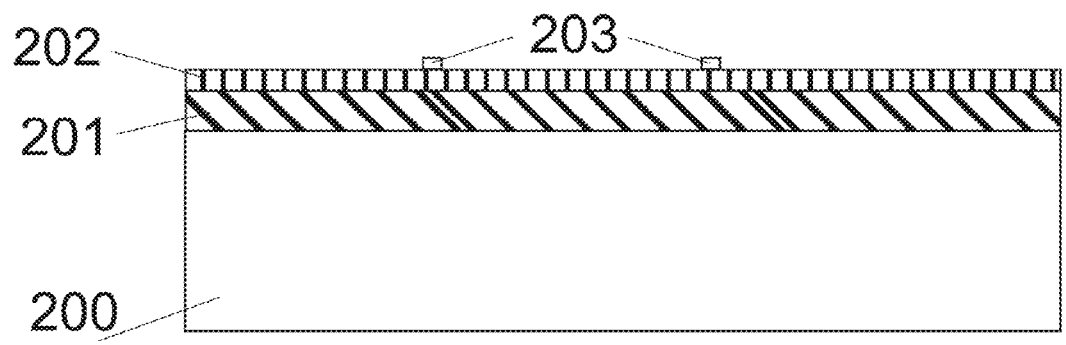
FIG. 2a shows a lateral view of a process step for fabrication of waveguide layer of a modulator device, in accordance with an embodiment of the invention.

FIGS. 2a~2h show the fabrication steps for fabrication of modulator in accordance with the embodiment of this invention. FIG. 2a shows a lateral view of a process step for fabrication of waveguide layer of a modulator device, in accordance with an embodiment of the invention.

Step 1:

The processing steps starts with a substrate (200), with a lower cladding layer (201) and an electro-optic slab core layer (202) transferred to the substrate (200), as shown in FIG. 2a. The substrate (200) can be silicon, and the lower cladding layer (201) can be silicon dioxide thermally grown on silicon. Furthermore, the electro-optic slab core layer (202) can be lithium niobate or lithium tantalite, which is transferred to the substrate using ion slicing technique that have been published previously by inventor (P. Rabiei, Appl. Phys Lett. Vol 85, No. 20, p 4603-4605). A high index ridge core section (203) is then formed on the electro-optic slab core region.

As also shown in FIG. 2a, the high index ridge core section (203) can also be produced by deposition of a high refractive index material, lithography, and etching methods. The high index ridge core section (203) can be made using materials such as tantalum oxide, lanthanum oxide, titanium oxide, silicon nitride, aluminium nitride, silicon or similar high index materials. In the preferred embodiment of the invention, the high index ridge core section (203) and the electro-optic slab core region (202) form the core of the optical waveguide together.

Figure 2B:
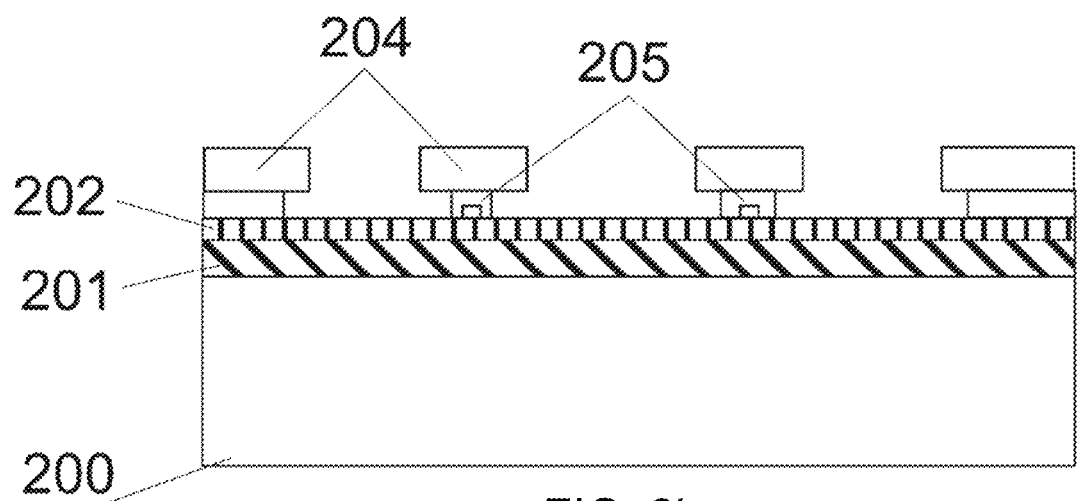
FIG. 2b shows a lateral view of a subsequent process step for fabrication of the mesa of optical modulator device, in accordance with an embodiment of the invention.

FIG. 2b shows a lateral view of a subsequent process step for fabrication of the mesa of optical modulator device, in accordance with an embodiment of the invention.

Step 2:

In this step, as shown in FIG. 2b, the sample is covered with a bilayer resist layer (204). A large under-cut is produced in the lower layer (205) using standard lift of resist materials.

Figure 2C:
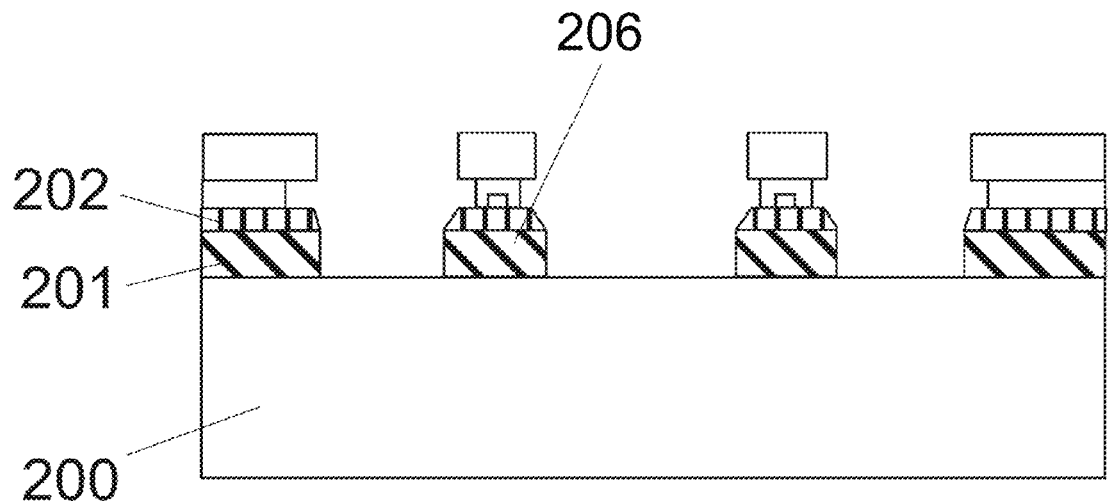
FIG. 2c shows a lateral view of a subsequent process step for fabrication of mesa of optical modulator device, in accordance with an embodiment of the invention.

FIG. 2c shows a lateral view of a subsequent process step for fabrication of mesa of optical modulator device, in accordance with an embodiment of the invention.

Step 3:

In this step, as shown in FIG. 2c, the sample is then etched to remove the slab core electro-optic layer (202) and optionally the lower cladding layer (201). Because the etch rate of the electro-optic layer is much lower than the photo-resist and the lower cladding layer, a trapezoidal shaped mesa (206) is formed after the etching step, as shown in FIG. 2c.

Figure 2D:
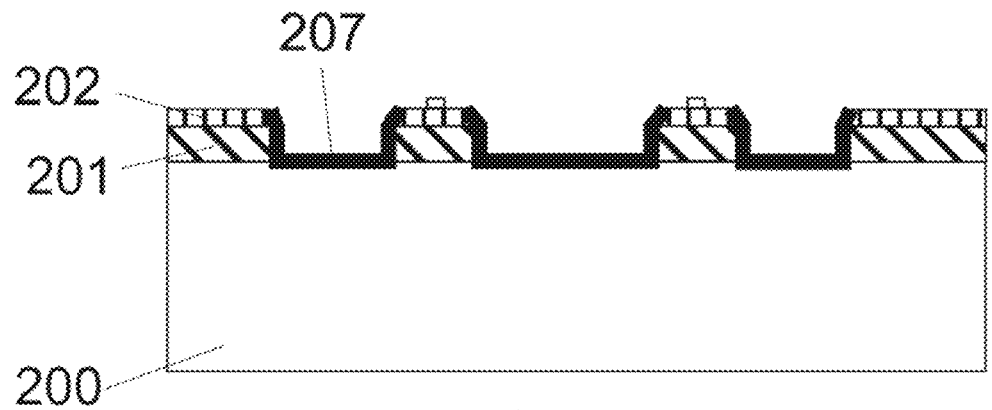
FIG. 2d shows a lateral view of a subsequent process step for fabrication of modulation electrode layer of the optical modulator device, in accordance with an embodiment of the invention.

FIG. 2d shows a lateral view of a subsequent process step for fabrication of modulation electrode layer of the optical modulator device, in accordance with an embodiment of the invention.

Step 4:

In this step, after the etching is performed from Step 3, a metal electrode layer (207) is deposited and lifted off from the sample to form the modulation electrodes for the device, as shown in FIG. 2d.

Figure 2E:
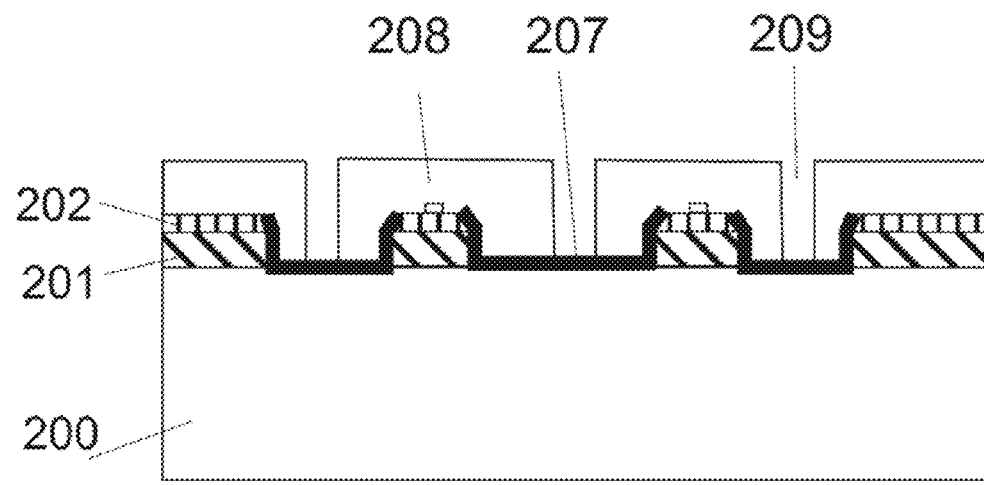
FIG. 2e shows an offset lateral view of a subsequent process step for fabrication of passivation layer and vias of the optical modulator device, in accordance with an embodiment of the invention.

FIG. 2e shows an offset lateral view of a subsequent process step for fabrication of passivation layer and vias of the optical modulator device, in accordance with an embodiment of the invention.

Step 5:

In this step, the sample is passivated with a top cladding layer (208).

Furthermore, a via (209) is subsequently etched into the sample to reach the metal electrode layer (207) as shown in FIG. 2e.

Figure 2F:
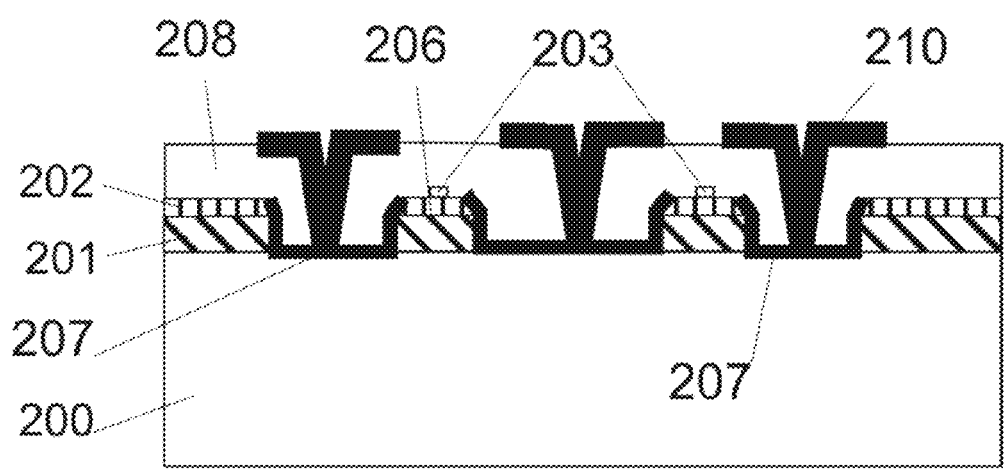
FIG. 2f shows a lateral view of a subsequent process step for fabrication of the transmission line electrodes of the modulator optical device, in accordance with an embodiment of the invention.

FIG. 2f shows a lateral view of a subsequent process step for fabrication of the transmission line electrodes of the modulator optical device, in accordance with an embodiment of the invention.

Step 6:

In this step, a transmission line electrode layer (210) is patterned on the substrate using an electro-plating method or other methods, as shown in FIG. 2f.

Figure 2G:
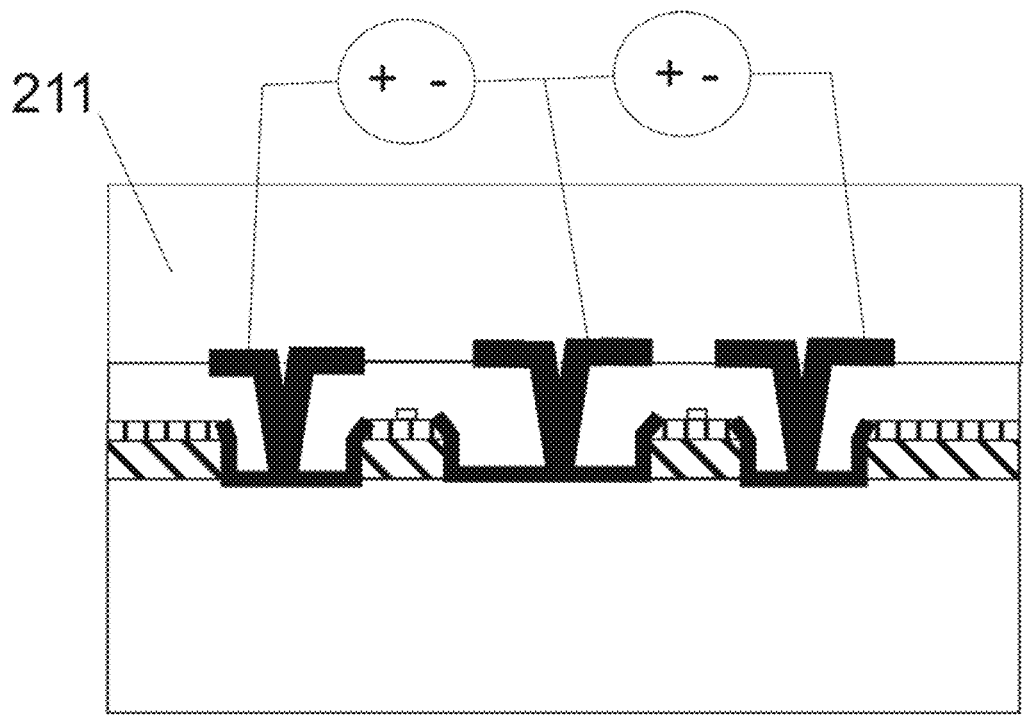
FIG. 2g shows a poling process step for fabrication of the optical modulator devices in accordance with an embodiment of the invention.

FIG. 2g shows a poling process step for fabrication of the optical modulator devices in accordance with an embodiment of the invention.

Step 7:

In this step, the poling process is achieved by applying a voltage to the electrodes of the transmission line, as shown in FIG. 2g. A photoresist layer is deposited on top of the device (211) to eliminate arcing between the electrodes, and a large DC voltage is applied to the electrodes of the device to pole the device between each pairs of the coplanar transmission lines. As a last fabrication step, the resist is then removed.

Moreover, in one embodiment of the invention, the substrate (200) is made of silicon and may incorporate electronic circuits, optical circuits, or both. The lower cladding layer (201) is an optically transparent material with a thickness between 200 nm to several microns. Furthermore, the lower cladding layer (201) can be made of a silicon dioxide ($SiO_2$) layer grown on silicon using a thermal oxidation method. In another embodiment, the lower cladding layer (201) can be made of other low refractive index materials. The lower cladding layer (201) is needed to confine the light in the core region of the waveguide. The slab core region layer (202) can be an electro-optic material, such as lithium niobate or lithium tantalite, and can be made by transferring a thin layer of electro-optic materials from a lithium niobate crystals to the substrate (200) by using ion implantation and crystal ion slicing as disclosed in previous publications (P. Rabiei, Appl. Phys Lett. Vol 85, No. 20, p 4603-4605). This thin layer of electro-optic materials can have a y-cut orientations of the crystal to achieve a desired poling, and the thickness can vary between 50 nm to a few microns, depending on a particular need of an application.

Furthermore, the modulation electrodes can be placed on the +z and −z surface of the crystal in the etched mesa regions to perform the poling process and also to achieve electro-optic modulation. In addition, the top ridge waveguide layer (203) can be a high index layer containing high refractive index oxide elements, such as niobium pentoxide, lanthanum oxide, boron trioxide, tantalum oxide, zichornium oxide, or other high refractive index materials, such as chalcogonide glass materials, silicon nitride, aluminium nitride, silicon or other high index materials. This layer can also be the same as electro-optic slab core material and be formed by an etching step. The thickness of this layer is between 50 nm to a few microns, depending on the operation wavelength. This layer can be deposited using various methods, such as e-beam evaporation, sputtering, or spin coating. An optical circuit pattern is written on a resist layer on top of this layer using standard nanofabrication methods, such as deep UV lithography and e-beam lithography, and etched using plasmas. If an etching method is used, a hard etch mask layer may be formed by deposition and etching, or a lift off method. The hard mask layer can be metals, such as chrome, or dielectrics, such as $SiO_2$. Alternatively, the high index glass layer can be deposited and patterned in one step using lift off method. The layer may also be produced using previously disclosed methods by the inventor of record in U.S. Pat. No. 8,900,899 and US Patent Publication 2015/0001175.

In the preferred embodiment, the modulation electrode layer (207) is formed by electro-beam evaporation and comprises a thin adhesion layer such as titanium or chromium with a thickness of 10 nm and a gold layer with a thickness of approximately 50 nm to 300 nm. Furthermore, the passivation top cladding layer (208) layer can be made from polymers or other low refractive index layers, such as silicon dioxide, and can have a thickness of 1 micron to several microns.

In the preferred embodiment, the RF transmission line layer (210) may be produced by electro-plating gold on the device. The layer thickness maybe one micron to several microns. In addition, the mesa (206) is formed by an etching method, which includes a step of etching the electro-optic slab core region (202) and a subsequent etching of the lower cladding layer (201). This can be achieved, for example, by a two-step etch method comprising an argon etch step to remove the electro-optic slab core region and a fluorine chemistry step to remove the bottom cladding layer.

The novel method for fabrication of the electro-optic modulator, as shown in FIG. 2a~2g, can be utilized in manufacturing of a variety of different electro-optical modulation devices. Although some of these device examples are described in this Specification, this novel method for fabrication of the electro-optic modulator can be utilized in many types of electro-optical circuits that desire spatial compactness and high-speed modulation performance as critical design criteria.

Figure 3:
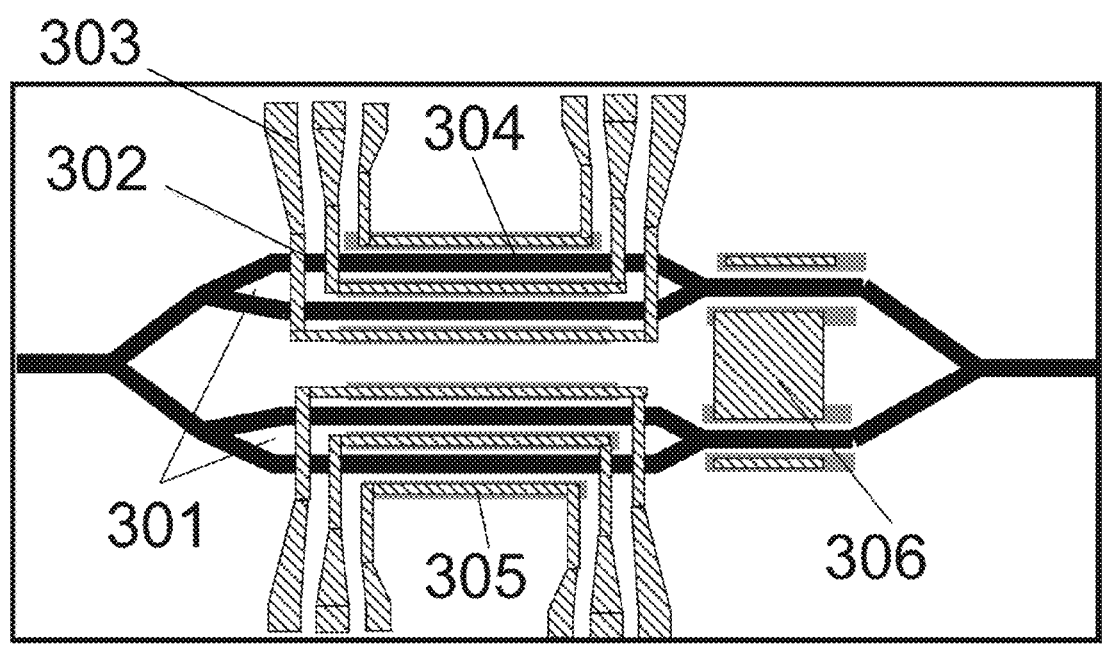
FIG. 3 shows a dual parallel Mach-Zehnder optical modulator that can be made using the method of fabrication of modulator device in accordance with the embodiment of the invention.

As a first example of an optical circuit that can be produced using a method of fabrication in accordance with an embodiment of the invention, FIG. 3 shows a dual parallel Mach-Zehnder optical modulator that can be produced by the novel method for fabrication of the electro-optic modulator. In this example, the modulator comprises two nested Mach-Zehnder modulator (301) that are fed by a Y-junction, with phase-shifted (306) combinatory output to achieve modulation of optical signal.

FIG. 3 shows the two arms of the modulator (301) that comprises an optical waveguide (302, 304), modulation electrodes (305), RF transmission lines (303), and the phase shifter at the output. Some other layers that may need to be present in the figure, such as vias and an etched mesa, are not shown in FIG. 3 for clarification of the invention. The modulator cross section in the vicinity to the modulation arms is preferably identical to the cross section shown in FIG. 1a, and the modulator can be fabricated using the method steps shown in FIG. 2a~FIG. 2g. More advanced amplitude and phase modulators with more nested arms may be made using the method of fabrication that is explained in this invention. Because the modulation voltage for this modulator is lower due to high index contrast waveguide, while the waveguide can be bent to small radiuses as shown in FIG. 1b, the size of dual parallel Mach-Zehnder optical modulators can be reduced by employing the method of fabrication disclosed in this invention. Furthermore, this modulator design may accommodates bending of the arms of the modulator, as shown in FIG. 1b, for example, to produce compact modulators.

Figure 4:
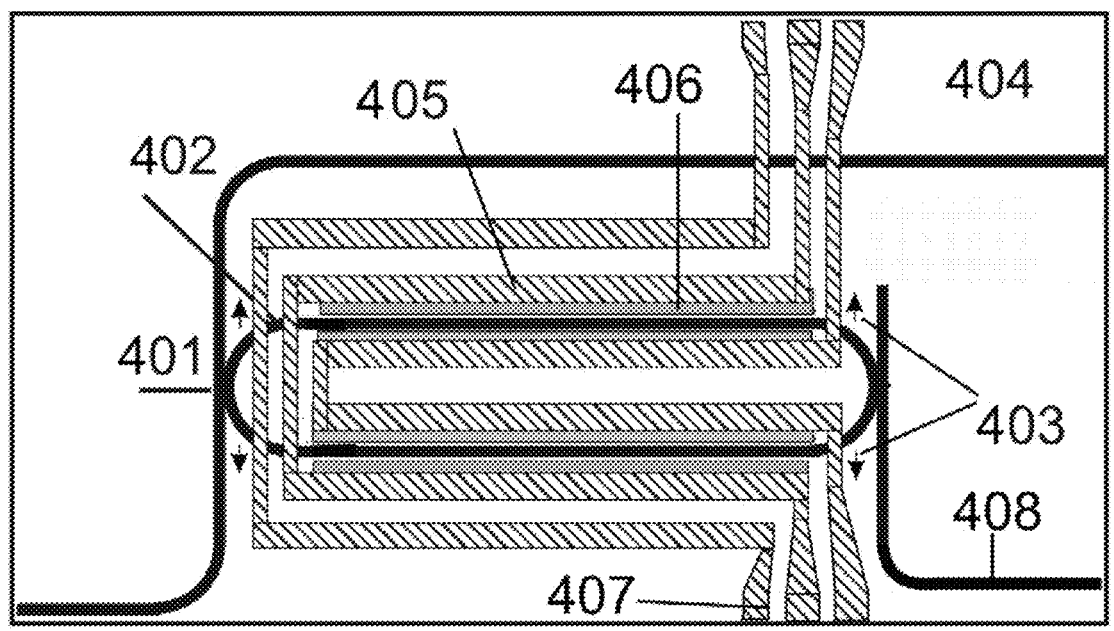
FIG. 4 shows a resonance enhanced modulator that can be made using the method of fabrication in accordance with an embodiment of the invention.

As another example of an optical circuit that can be produced using a method of producing a high-refractive index contrast waveguide in accordance with an embodiment of the invention, FIG. 4 shows a micro-ring modulator device produced in accordance with an embodiment of the invention. A micro-ring modulator device, as shown in FIG.

4, comprises an input coupler (401) that couples light between an input waveguide and a micro-ring resonator (402), and an optional output waveguide (408). The output waveguide (408) and the rest of the micro-ring structure, as shown in FIG. 4, can be made by method of fabrication of high index contrast waveguide, as described previously in accordance with an embodiment of the invention.

Continuing with FIG. 4, the slab region (404) for all of the waveguides in the micro-ring modulator device can be made from lithium niobate or lithium tantalate. Furthermore, modulation electrodes (406) and the RF transmission line electrodes (405) and connection pads (407) can be deposited on a surface of the substrate to control the refractive index of the micro-ring resonator (402) to enable modulation. Etched mesa and via will be used to achieve a device cross section similar to FIG. 1a. This device can behave as a tunable optical filter or an optical modulator. The tuning is achieved by applying an electrical signal to the modulation electrodes (406). In this example, the applied electric field direction (403) is shown as "up" and "down" arrows in FIG. 4. The applied electrical signal changes the refractive index of the slab region (404) in order to achieve tuning or modulation function. The device can also operate at very high modulation frequency in a resonance enhanced mode to generate narrow sideband modulation or frequency combs that are required for many different applications.

Figure 5:
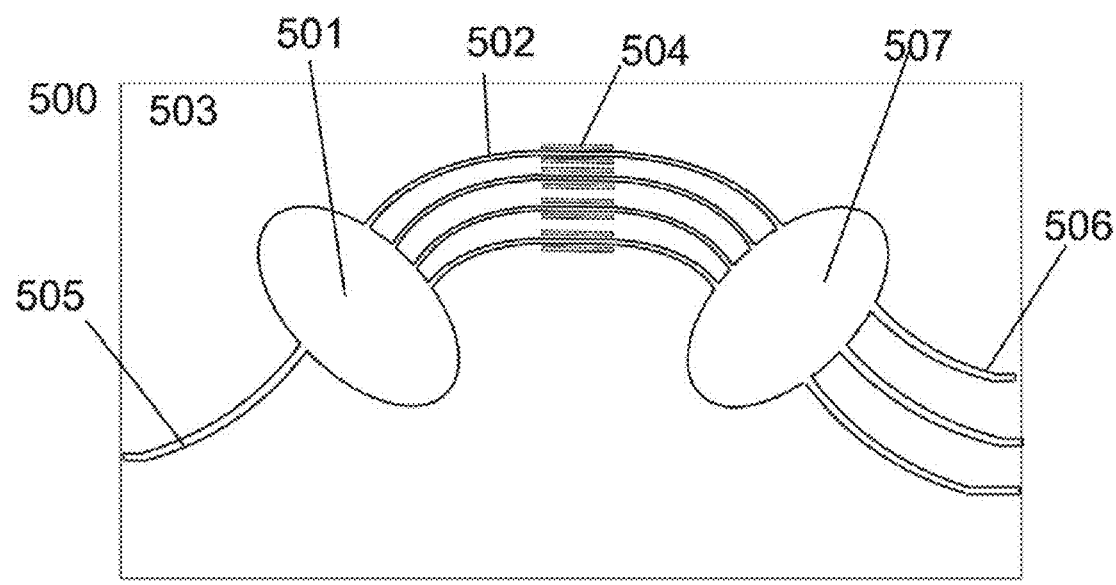
FIG. 5 shows an array waveguide grating device that can be modulated in accordance with an embodiment of the invention.

As another example of an optical circuit that can be produced using a method of producing a high-refractive index contrast waveguide in accordance with an embodiment of the invention, FIG. 5 shows a tunable array waveguide grating device (500) produced using the method of producing the optical modulator device. An array waveguide grating device comprises an input optical waveguide (505), an input star coupler (501) that couple light between inputs and arms, a plurality of waveguide arms (502) that transport the energy between the input star coupler (501) and an output star coupler (507), and a plurality of output waveguides (506). The input and output waveguides (505, 506), the star couplers (501, 507), and the arms (502) of array waveguide grating can be defined by the nano-patterning of the high refractive index glass or oxide materials as described previously in accordance with an embodiment of the invention.

Continuing with FIG. 5, the slab region (503) of all the waveguides may be lithium niobate or lithium tantalate. Modulation electrodes (504) can be deposited on a surface substrate to control the refractive index of the arms (502) of the tunable array waveguide grating device to enable tuning of the tunable array waveguide grating device. Mesa and vias are etched as was explained in the fabrication procedure in FIG. 2. The RF transmission lines and associated interconnection layers are not shown in this figure to simplify the drawing will be added for high speed modulation. This device can behave as a tunable optical filter. The tuning is achieved by applying an electrical signal to at least one of the electrodes (504). The applied electrical signal changes the refractive index of the lithium niobate slab region (503) in order to achieve tuning function. Typically, different electrical voltage levels are needed for each arm to achieve the tuning. Because the electro-optic effect is used, the tuning function can be achieved very rapidly and is influenced by the speed of the applied electrical signal. Hence it is possible to develop advanced optical modulation devices such as optical frequency shift keying modulator using this structure.

Figure 6A:
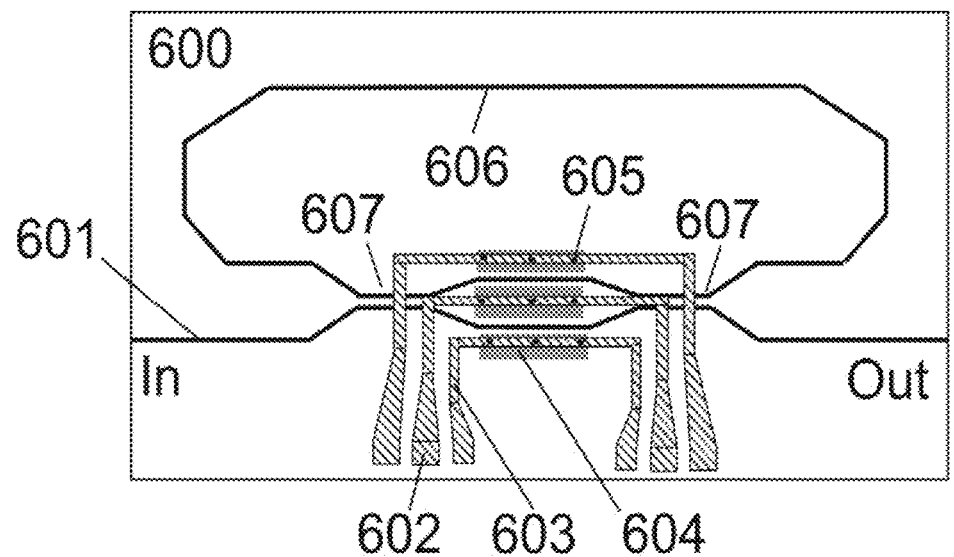
FIG. 6a shows a resonance enhanced Mach-Zehnder optical modulator in accordance with an embodiment of the invention.
Figure 6B:
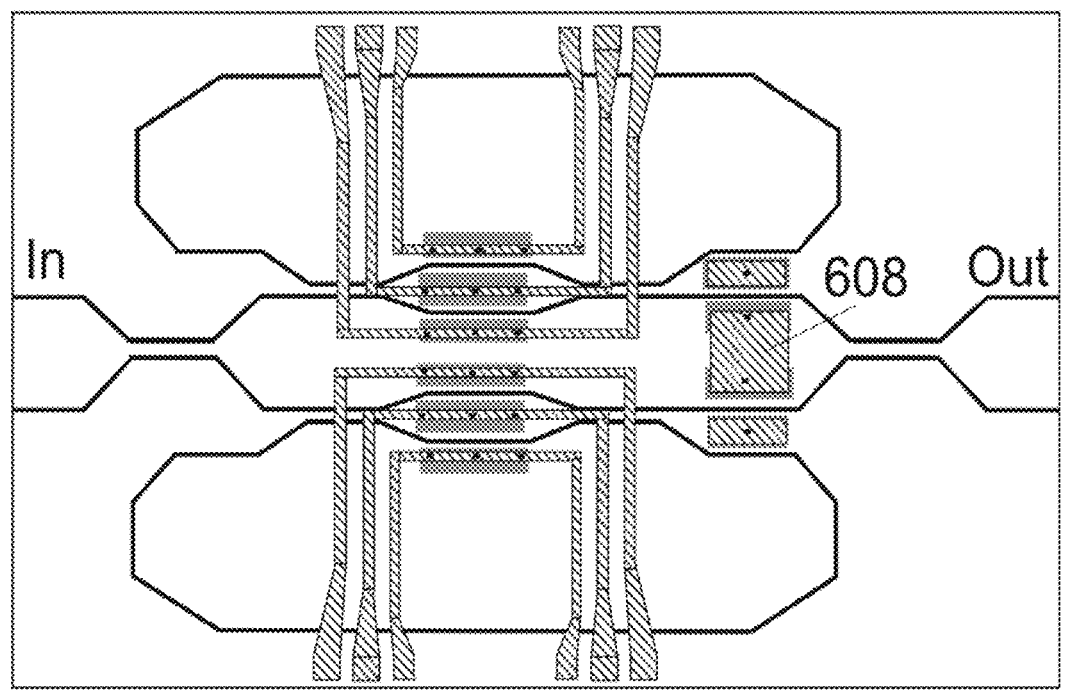
FIG. 6b shows a resonance enhanced dual-parallel Mach-Zehnder optical modulator in accordance with the embodiment of the current invention.

Another example of an optical circuit that can be produced using a method of fabrication in accordance with an embodiment of the invention is illustrated in FIGS. 6a and 6b. FIG. 6a shows a resonance enhanced optical Mach-Zehnder modulator that can be produced by the novel method for fabrication of the electro-optic modulator. In this example, the modulator comprises of a Mach-Zehnder modulator in which an input 3 dB-couplers and an output 3 dB coupler (607) are utilized. One of the outputs of the output 3 dB couplers is fed back to one of the inputs of the input 3 dB coupler. Using this method, a resonance or feedback circuit is formed which makes the device output much more sensitive to the Mach-Zehnder arm index modulation. Hence, extremely short modulation electrodes can be used that allows the modulator device to be very compact and hence it is possible to eliminate the metal losses caused by long electrodes which normally reduces modulation speed and can achieve very high speed optical signal modulation.

By properly biasing the device, it is possible to achieve good linearity for an intensity modulator that can be formed using this structure. This is possible since the even number modulation harmonics can be reduced to a small value by proper adjustment of the Mach-Zehnder modulator DC bias point. The linear intensity modulator based on resonance enhance Mach-Zehnder modulator is still worse than simple Mach-Zehnder modulators but it can be operated at higher speeds close to THz and beyond, which might be utilized for analog photonic applications such as RF front end receivers, photonic analog to digital convertors, high speed RF signal distribution, and similar devices.

FIG. 6a shows the two arms of the modulator (600) that comprises an optical input waveguide (601), modulation electrodes (604), RF transmission lines (603), connection pads (602), one input and one output 3 dB coupler (607), feedback waveguide (606), and vias for connection of RF electrodes to modulation electrodes (605). The modulator cross section in the vicinity to the modulation arms is preferably identical to the cross section shown in FIG. 1a, and the modulator can be fabricated using the method steps shown in FIG. 2a~FIG. 2g.

A more advanced resonance-enhanced optical amplitude and phase modulator with nested arms may be produced using the method of fabrication disclosed in this invention or other optical modulator fabrications methods and is shown in FIG. 6b. In this device, a dual resonance-enhanced Mach-Zehnder structure is incorporated into the modulator, where the light is modulated by dual parallel resonance-enhanced Mach-Zehnder optical modulators similar to FIG. 6a. The modulated output light of each of these modulators is combined at the output by using a phase shifter (608). This device resembles the simple dual parallel Mach-Zehnder optical modulator as illustrated in FIG. 3. However, it is resonance-enhanced by attaching one of the outputs of each of the 3 dB output couplers of Mach-Zehnder optical modulators to one of the inputs of their input 3 dB couplers. In addition, this structure can be used for making single side band modulators and quadrature phase shift keying modulators. By applying quadrature RF signal components to the electrodes of the two Mach-Zehnder modulators and by proper adjustment of DC bias point for each Mach-Zehnder modulator and the output phase section (608), it is possible to achieve a compact and high speed single side-band modulator or QPSK modulators. Resonance-enhanced Mach-Zehnder devices, as illustrated in FIGS. 6a and 6b, can be produced with various device fabrication steps previously described herein in association with FIGS. 2a~2g.

Figure 7:
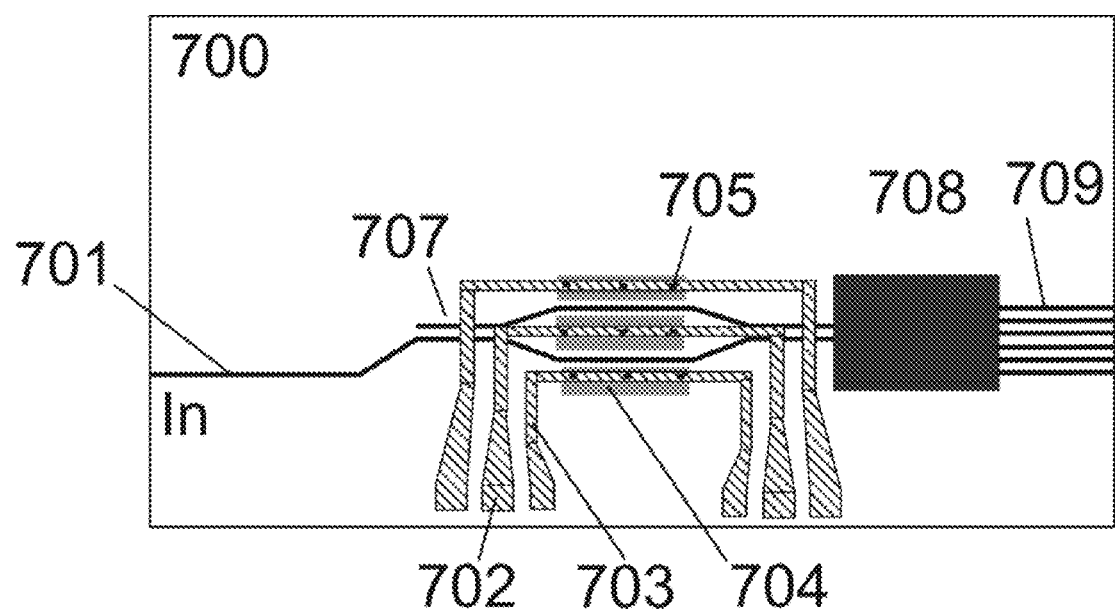
FIG. 7 shows a photonic-assisted analog to digital conversion device in accordance with the embodiment of the current invention.

FIG. 7 shows another example of a photonic-assisted analog to digital converter (PhADC) (700) that can be made using the method of fabrication that is disclosed in this inventions. The PhADC device is very similar to a standard Mach-Zehnder modulator device (optionally with folded arms as explained in FIG. 1). The PhADC (700) comprises an optical input waveguide (701), modulation electrodes (704), RF transmission lines (703), connection pads (702), one input coupler (707), and vias for connection of RF electrodes to modulation electrodes (705). However, the PhADC device has a free space propagation region (708) in the output and an array of waveguides (709) that are used to perform digital to analog conversion. The Mach Zehnder modulator deflects and sweeps the interference optical signal across the output waveguide array output proportionally to applied modulation RF signal. The output waveguide array will be connected to an array of high speed photodetectors. The measured detector signal is a digital circular code of the analog RF signal. Hence the device directly converts the analog RF signal to a digital signal. Since the Mach-Zehnder modulators disclosed in this invention can operate at very high speed and since large defraction angle is possible due to high index contrast technology, this method of fabrication of high speed modulators is particularly suitable for PhADC applications. The PhADC device can be produced with device fabrication steps that are previously described herein in association with FIG. 2a-2g.

Various embodiments of the present invention introduce one or more novel methods to produce optical waveguides and the modulation electrodes to control the optical circuit. In one embodiment of the invention, an optical waveguide is produced by deposition and etching of high index oxides on lithium niobate or lithium tantalate thin films to make high index contrast optical waveguide circuits. Subsequently, a mesa can be etched and modulation electrodes can be placed in close proximity of the optical waveguide. Then, RF transmission lines are constructed on the device and are connected to modulation electrodes by using vias.

Many optical circuits, such as Mach-Zehnder modulators, dual parallel Mach-Zehnder optical modulators, fast and widely tunable array waveguide grating modulators, resonance enhanced Mach-Zehnder modulators, and numerous integrated platforms combining these optical circuits can be manufactured based on one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for producing an optical modulator device, the method comprising the steps of:
    depositing or growing a first low refractive index material layer as a cladding layer on top of a silicon base substrate;
    depositing or transferring an electro-optic material layer on top of the first low refractive index material layer to form a slab core region;
    depositing a high refractive index material layer on top of the slab core region and forming a waveguide by etching the high refractive index material layer;
    forming an etch mask on the optical modulator device using a bilayer resist process;
    etching the electro-optic material to access the first low refractive index material layer;
    forming an electrode layer by depositing a metal and utilizing a lift-off process;
    depositing a second low refractive index material layer;
    etching vias in the second low refractive index material layer; and
    forming an RF transmission line layer by electro-plating or another layer-forming method.

2. The method for producing the optical modulator device of claim 1, further comprising a step of poling the optical modulator device when the waveguide and the RF transmission line layer incorporate one or more folded arms.

3. The method for producing the optical modulator device of claim 2, wherein the one or more folded arms provide quasi-phase matching between an RF modulation field and an optical field in the optical modulator device.

4. The method for producing the optical modulator device of claim 1, wherein the first low refractive index material layer and the second low refractive index material layer are each made of silicon dioxide or polymer, and wherein the electro-optic material layer is made of lithium niobate or lithium tantalite.

5. The method for producing the optical modulator device of claim 1, wherein the high refractive index material layer is made of silicon nitride, aluminum nitride, tantalum pentoxide, or niobium pentoxide, with a refractive index approximately between 2 and 2.3.

6. The method for producing the optical modulator device of claim 1, wherein a modulation arm of a Mach-Zehnder optical modulator is produced by the steps recited in the method.

7. The method for producing the optical modulator device of claim 1, wherein a modulation arm of a micro-ring modulator is produced by the steps recited in the method.

8. The method for producing the optical modulator device of claim 1, wherein a dual parallel Mach-Zehnder optical modulator is produced by the steps recited in the method.

9. The method for producing the optical modulator device of claim 1, wherein a resonance-enhanced Mach-Zehnder optical modulator is produced by the steps recited in the method.

10. The method for producing the optical modulator device of claim 1, wherein a dual parallel resonance-enhanced Mach-Zehnder optical modulator is produced by the steps recited in the method.

11. The method for producing the optical modulator device of claim 1, wherein a tunable array waveguide grating device is produced by the steps recited in the method.

12. The method for producing the optical modulator device of claim 1, wherein a photonic assisted analog to digital conversion device is produced by the steps recited in the method.

* * * * *